Nov. 23, 1954  C. R. WITSCHONKE  2,695,353
CONSTANT TEMPERATURE CONTROL APPARATUS
Filed April 10, 1952

INVENTOR
CHARLES R. WITSCHONKE,
BY
ATTORNEY

United States Patent Office 2,695,353
Patented Nov. 23, 1954

2,695,353

CONSTANT TEMPERATURE CONTROL APPARATUS

Charles R. Witschonke, Somerville, N. J., assignor to American Cyanamid Company, New York, N. Y., a corporation of Maine Application April 10, 1952, Serial No. 281,697

3 Claims. (Cl. 219—20)

This invention relates to a constant temperature control apparatus and more particularly to an improved voltage control means therefor.

In many industrial operations, it is important to control accurately the application of voltage to electrical equipment. For example, the maintenance of a thermostatted bath at temperatures appreciably above room temperature and of minimizing fluctuations in temperature require accurate control of the voltage applied to the heater units for the fluid baths. Moreover, many operations require the use of such fluid baths for the carrying out of chemical reactions, the temperature of which must be controlled to a very accurate degree. In such operations, it has been the practice in the past to employ two heater units for the bath, one heater running continuously at a setting slightly below that required to maintain the desired temperature of the bath, while the second heater, controlled by an on-off thermoregulator, serves to supply additional heat to bring the temperature of the bath up to the desired level. In the use of such equipment, the second heater unit heats the bath up to the deisred point and then cuts off, after which the temperature of the bath drops to the temperature set by the first heater and the cycle is then repeated.

Such an arrangement is relatively costly, requiring as it does the use of two heater units and two autotransformers.

I have found that the same close temperature control may be obtained in a more facile manner and by the use of less equipment than heretofore possible.

The present invention is concerned with an improved electrical circuit that permits extremely accurate control of the voltage applied to electrical equipment such as heaters and the like. For purposes of illustration, the present invention will be described more in detail in conjunction with the problem of accurately thermostatting a fluid bath, although it will be obvious that the invention is not strictly limited thereto as it has application to other electrical heating equipment involving on-off control requiring the use of voltages slightly above or below those needed for perfect control.

Figure 1 of the drawing shows diagrammatically an illustrative embodiment of the present invention.

Figure 1:
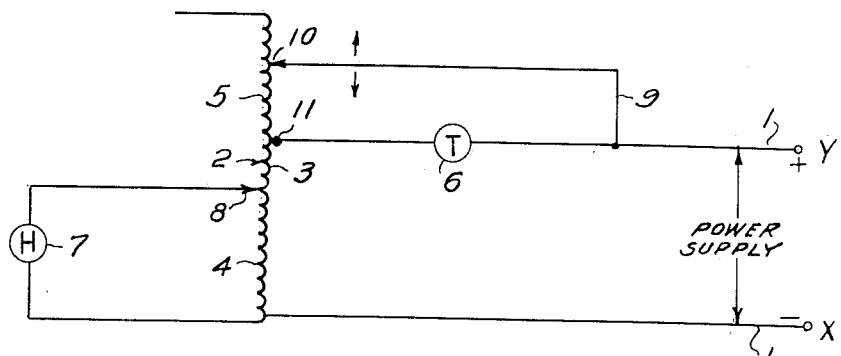

Referring to Figure 1, alternating current is supplied from a suitable source through leads 1 to an inductance generally designated by the numeral 2, having a primary winding 3, and a secondary winding 4. The inductance is provided with a series of added windings 5. An economical way of manufacturing such an inductance is to add a series of windings to an autotransformer. The current flows through one side of the line through series-connected thermoregulator 6 which may be a suitable bi-metallic strip that expands and contracts in response to temperature changes to open and break the circuit. The current actuates a suitable heater indicated by the numeral 7, the voltage to which is controlled by sliding contact 8. Numeral 9 indicates a branch from the main tap on the inductance leading to the auxiliary windings 5, the voltage being varied by adjustment of movable contact 10 up and down as illustrated. A suitable stop 11 is provided to prevent sliding contact 10 from going below this point.

In operation of the circuit illustrated in Figure 1, movable contacts 8 and 10 are initially adjusted so that the current therethrough is such as to maintain the heater to as close to the desired temperature of the bath as is possible to do so. When thermoregulator 6 is open, the voltage applied to heater 7 is reduced by a factor substantially proportional to the number of windings from stop 11 to movable contact 10 divided by the number of windings from stop 11 to the junction of the inductance on the other side of the line. Thus, by adjusting movable contacts 8 and 10 so that a slight excess heat is applied when thermoregulator 6 is closed and a deficiency of heat when the thermoregulator is open, the equivalent of a two-heater system is achieved.

It will be understood that thermoregulator 6 closes and permits current to flow through the main line when the temperature of the bath falls below the desired setting to thereby bring the temperature of the bath back to the desired level. It will also be understood that the natural inductance of the added windings 5 makes such windings inoperative when thermoregulator 6 is closed. It is also to be observed that the current normally travels through the circuit via the branch line 9 and only flows through the main line via thermoregulator 6 when such thermoregulator is actuated which, as explained heretofore, is whenever the temperature of the bath drops below the desired setting.

Figure 2:
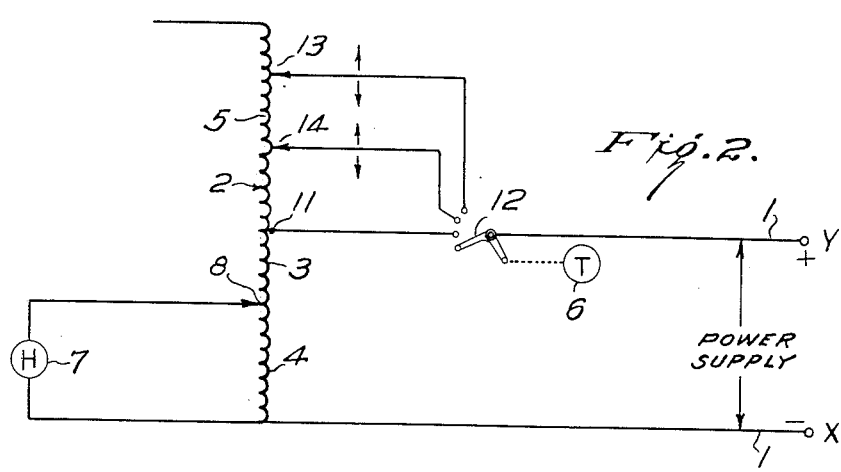
Figure 2 shows a modification thereof.

In the modified form of the invention illustrated in Figure 2, thermoregulator 6 actuates, by appropriate linkage, single pole, three-position switch 12. Sliding contacts 13 and 14 are adjustable in the same manner as is movable contact 10 shown in Figure 1.

As will be obvious, the circuit shown in Figure 2 operates in a manner similar to that shown in Figure 1, the voltage applied to heater 7 being varied through the closing of the circuit by switch 12 through adjustable taps 13 and 14.

This circuit is especially advantageous where greater ranges of control are required to compensate for major changes in the temperature of the bath. These changes may be brought about by the introduction of cooler or colder material in either the fluid or reaction vessel at a rate which is not a function of the reaction. A change in the ambient conditions may also occur. Thus, for example, if the thermostatted bath is functioning in a room with a daytime temperature of 70° F. and a nighttime temperature of 60° F., this change in the ambient condition demands that a larger input of heat energy will be required in order to keep the temperature of the thermostatted bath constant without undue time lag. This can be accomplished by the circuit shown in Figure 2 wherein the thermostat is equipped with a plurality of contacts. Here, the thermostat arm 12 may make contact with taps connected with points 11, 13 or 14, thereby increasing the energy input according to the increase in demand. This circuit is especially advantageous where greater flexibility and control are desired at the expense of a more complicated switch arrangement than the on-off switch used in Figure 1.

Figure 3:
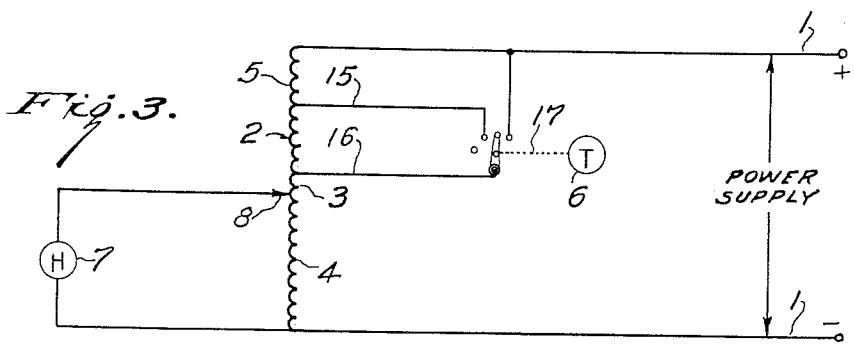
Figure 3 shows a further modification.

In the modification illustrated in Figure 3, the movable contacts 13 and 14 of Figure 2 are replaced by one side of the line and by fixed tap 15. In this circuit, switch 17 is pivoted to the inductance 2 rather than to the A. C. line as shown in Figures 1 and 2. In the operation of the circuit shown in Figure 3, the fixed taps are operated successively by switch 17 through the medium of thermoregulator 6 and serve to short out portions of the coil, thus varying the voltage applied to heater 7.

As stated hereinbefore, the circuits illustrated in Figures 2 and 3 provide greater flexibility of control of the voltage applied to the heater and thus compensate more quickly for variations in the temperature of the bath. This is accomplished, however, at the expense of a more complicated switch arrangement, and, therefore, ordinarily I prefer to use the more simple on-off switch used in conjunction with the apparatus shown in Figure 1 as this arrangement has been found to produce excellent results in practice.

The present invention is not limited to any particular voltage, either high or low voltage sources may be used, depending upon the use to which the invention is applied.

I claim:

1. A constant temperature control apparatus comprising in combination an A. C. line having sides $x$ and $y$, an inductance having at least two sliding contacts, one end of said inductance being connected to side $x$ of the A. C. line, means for connecting the side $y$ of the A. C. line to at least one of said sliding contacts positioned near the other end of said inductance, a temperature sensitive switch connected between the side $y$ of the A. C. line and at least one tap on said inductance, said tap being positioned between one of said sliding contacts and side $x$ of the A. C. line, and a heating element, one end of which is connected to side $x$ of the A. C. line and the other end of which is connected to a sliding contact on the inductance.

2. An apparatus according to claim 1 in which said means for connecting the side $y$ of the A. C. line to the other end of said inductance includes a three-position switch.

3. A constant temperature control apparatus comprising in combination an A. C. line having sides $x$ and $y$, an inductance having two sliding contacts, one end of said inductance being connected to side $x$ of the A. C. line, side $y$ of the A. C. line being connected near the other end of said inductance through one of said sliding contacts, a temperature sensitive switch connected between the side $y$ of the A. C. line and a fixed tap on said inductance, said fixed tap being positioned between said one sliding contact and side $x$ of the A. C. line, and a heating element, one end of which is connected to side $x$ of the A. C. line and the other end of which is connected to the other of said sliding contacts.

References Cited in the file of this patent

UNITED STATES PATENTS

| Number | Name | Date |
|---|---|---|
| 1,338,408 | Thornton | Apr. 27, 1920 |
| 1,478,302 | Snodgrass et al. | Dec. 18, 1923 |
| 2,100,328 | Getchell | Nov. 30, 1937 |
| 2,231,420 | Gille | Feb. 11, 1941 |